UNITED STATES PATENT OFFICE.

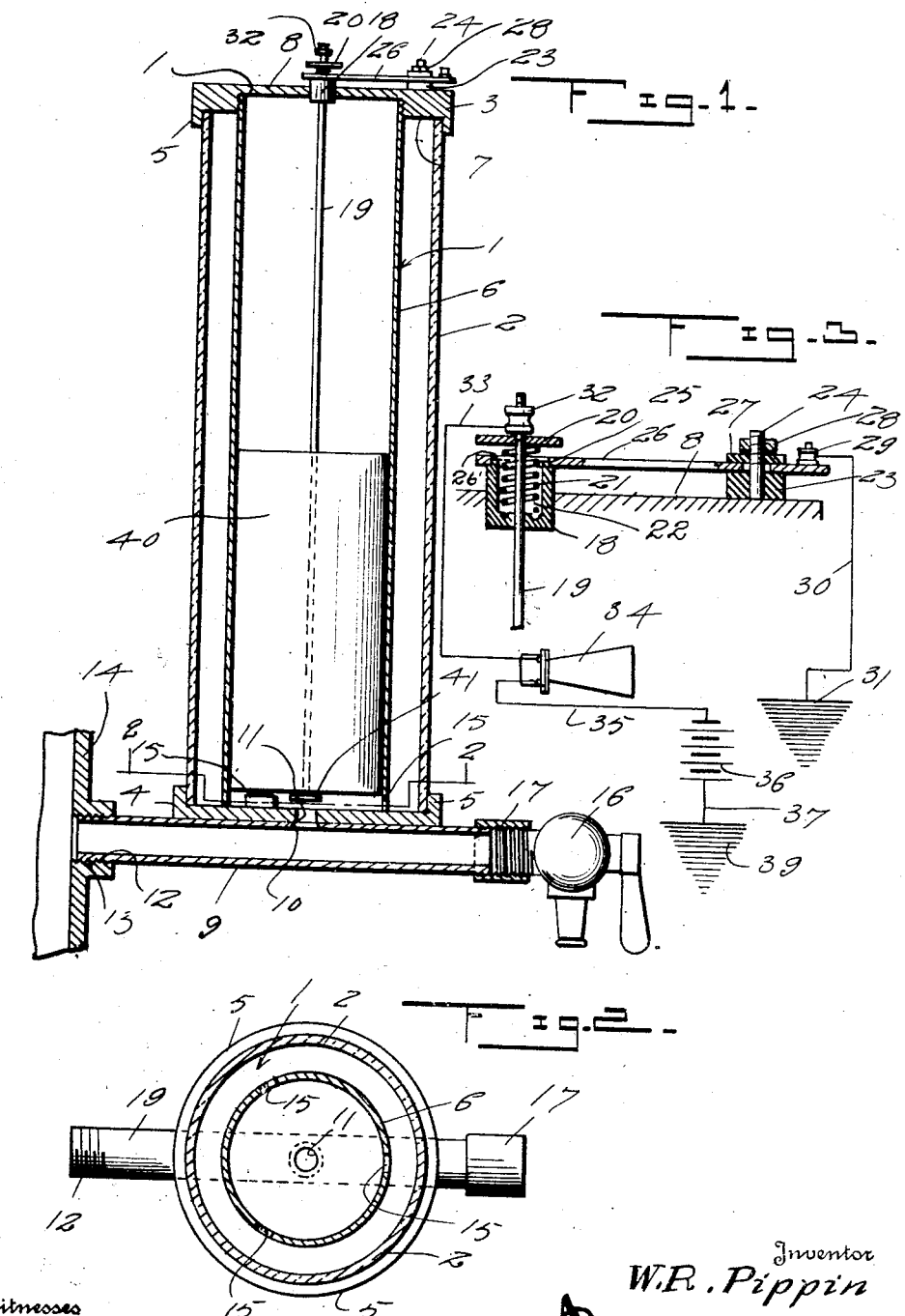

WILLIAM R. PIPPIN, OF PARIS, TEXAS.

LIQUID-INDICATOR FOR TANKS.

1,311,244.  Specification of Letters Patent.  Patented July 29, 1919.

Application filed August 22, 1917. Serial No. 187,707.

*To all whom it may concern:*

Be it known that I, WILLIAM R. PIPPIN, a citizen of the United States, residing at Paris, in the county of Lamar and State of Texas, have invented certain new and useful Improvements in Liquid-Indicators for Tanks; and I do hereby declare the following to be a full, clear, and exact description of the invention, such as will enable others skilled in the art to which it appertains to make and use the same.

This invention relates to liquid indicators for tanks and more particularly to an indicator for the crank case of an internal combustion engine for automobiles, and the primary object of the invention is to provide means to determine whether the supply of oil in the crank case is exhausted.

Another object of the invention is to provide means for giving an audible signal, when the oil in the crank case is low, so as to call attention to the fact that more oil is required.

A still further object of the invention is the provision of means for closing an electric circuit, when the oil in the crank case becomes exhausted so as to blow a horn or other signal and giving warning to the occupant of a vehicle that more oil is required.

A still further object of the invention is to provide a gage having a float slidably mounted therein, which is adapted to close an electric circuit when the liquid is exhausted in the gage.

A still further object of the invention is to provide an indicator of the above character which is durable and efficient in use, one that is simple and easy to manufacture, and one that can be placed upon the market at a reasonable price.

With these and other objects in view, the invention consists in the novel construction, arrangement and formation of parts, as will be hereinafter more specifically described, claimed and illustrated in the accompanying drawing forming a part thereof in which:

Figure 1 is a detail sectional view of the improved indicator showing the same applied to a crank case of an internal combustion engine, Fig. 2 is a transverse sectional view taken on the line 2—2 of Fig. 1, and Fig. 3 is an enlarged sectional view of the upper portion of the indicator showing the means for closing the circuit and the wires in diagram.

Referring to the drawing in detail wherein similar reference numerals designate corresponding parts throughout the several views, the numeral 1 generally indicates the improved indicator which includes the gage cylinder 2, which is preferably formed of glass or other transparent material and has a circular top wall 3 and a bottom wall 4. The top and bottom walls 3 and 4 respectively have inwardly extending peripheral flanges 5 which hold the cylindrical glass gage section 2 in position. Arranged concentrically in the cylindrical glass gage 2 is a guide cylinder 6, which is secured to the lower wall 4 in any preferred manner and extends slightly above the upper edge of the glass cylinder. The upper end of the guide cylinder 6 is threaded as at 7 and is received in the internally threaded circular recess 8 formed in the central lower surface of the top wall 3, which holds the guide cylinder 6 in correct spaced relation with the glass cylinder 2. A short pipe 9 is secured to the outer surface of the bottom wall 4 and this pipe has an aperture 10 which registers with an aperture 11 formed in the bottom wall. The inner end of the pipe section 9 is externally threaded at 12 and is adapted to be fitted in the internally threaded boss 13 formed on the crank case 14. The guide cylinder 6 is formed with a plurality of apertures 15 in its lower surface, through which the oil from the crank case 14 seeps and by looking in the glass cylinder 2, the height of the oil in the crank case can be readily determined. A pet cock 16 is secured to the outer end of the pipe 9 by means of a coupling 17 and the oil from the crank case is adapted to be drained therefrom by means of the pet cock when so desired.

An insulating plug 18 is fitted in the central portion of the top wall 8 and slidably receives a guide stem 19 which extends substantially to the lower wall 4. The upper end of the guide stem 19 receives a contact plate 20 and an expansion coil spring 21 bears against the lower surface of the contact plate and normally holds the guide stem in an extended position. The spring 21 is fitted in a recess 22 in the insulating plug 18 and when the stem 19 is depressed, the spring fits wholly in this recess. A second solid insulating plug 23 is secured on the upper surface of the top wall 3 and is held in position by means of a pin 24. A connecting plate 26 extends from the insulating plug 23 to the insulating plug 21 and the end of the insulating plug 21 is reduced as at 25 and is received in an aperture 26' formed in the connecting plate. The connecting plate 26 is held in position by means of an insulating plug 27 which is fitted over the pin 24 and the same is held in position by means of a nut 28. One end of the connecting plate 26 has connected thereto one terminal 29 of the wire 30, which has its opposite end grounded as at 31 to the vehicle. A second terminal 32 is secured to the end of the stem 19 and this terminal is in engagement with the contact plate 20. The opposite terminal of the wire 33 which is connected to the guide stem 19 is connected to one terminal of an electrical horn 34 or other signal and a connecting wire 35 is secured to the other terminal of the electric horn and to a battery or other electrical source of energy 36 which in turn has a wire 37 grounded as at 39. A cylindrical float 40 is reciprocably mounted in the guide cylinder 6 and is slidably mounted on the guide stem 19 and when the guide cylinder is filled with oil the float 40 will rise in the cylinder 6, but when the oil leaves the cylinder 6 (as the oil in the crank case is used) the cylinder 40 will slide down the guide stem 19 and come in contact with the plate 41 secured on the lower end of the guide stem and force the guide stem 19 downward against the tension of the coil spring 21 and force the contact plate 20 in engagement with the contact plate 26 and thus close the circuit which sounds the horn 34 or other signal placed in the circuit.

The device can be applied to the crank case by removing the ordinary pet cock (not shown), which is secured to the bottom of the crank case and ordinarily used for draining the crank case of its contents, and by placing the short pipe section 9 in lieu thereof.

While the liquid indicator has been shown and described as connected to the crank case of an internal combustion engine, it is to be understood that the device can be used on any tank containing liquid, such as a gasolene tank.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:—

In a sight gage and alarm for tanks and the like, an outwardly extending pipe connected to the lower portion of the tank and having an opening in the upper surface thereof, a transparent cylinder, a guide cylinder arranged concentrically in the transparent cylinder, means joining the upper and lower surfaces respectively of said cylinders, means connecting the lower portions of the cylinders with the pipe and communicating with the opening therein, said guide cylinder having a plurality of openings in its lower edge, a normally open electrical circuit, a contact carried by the upper portion of the cylinder, a guide stem slidably mounted in the central portion of the guide cylinder, a contact carried by the upper portion of said guide stem, spring means normally holding said guide stem in its extended position, and a float slidably mounted in the cylinder and on said guide stem, whereby upon downward movement of said float, the stem will be carried therewith to close the electrical circuit.

In testimony whereof I affix my signature in presence of two witnesses.

WILLIAM R. PIPPIN.

Witnesses:
W. A. HUTCHISON,
ELMA MCCRACKEN.